April 28, 1959  G. C. LUEBKEMAN  2,883,754
DRAFTING DEVICES
Filed May 31, 1955
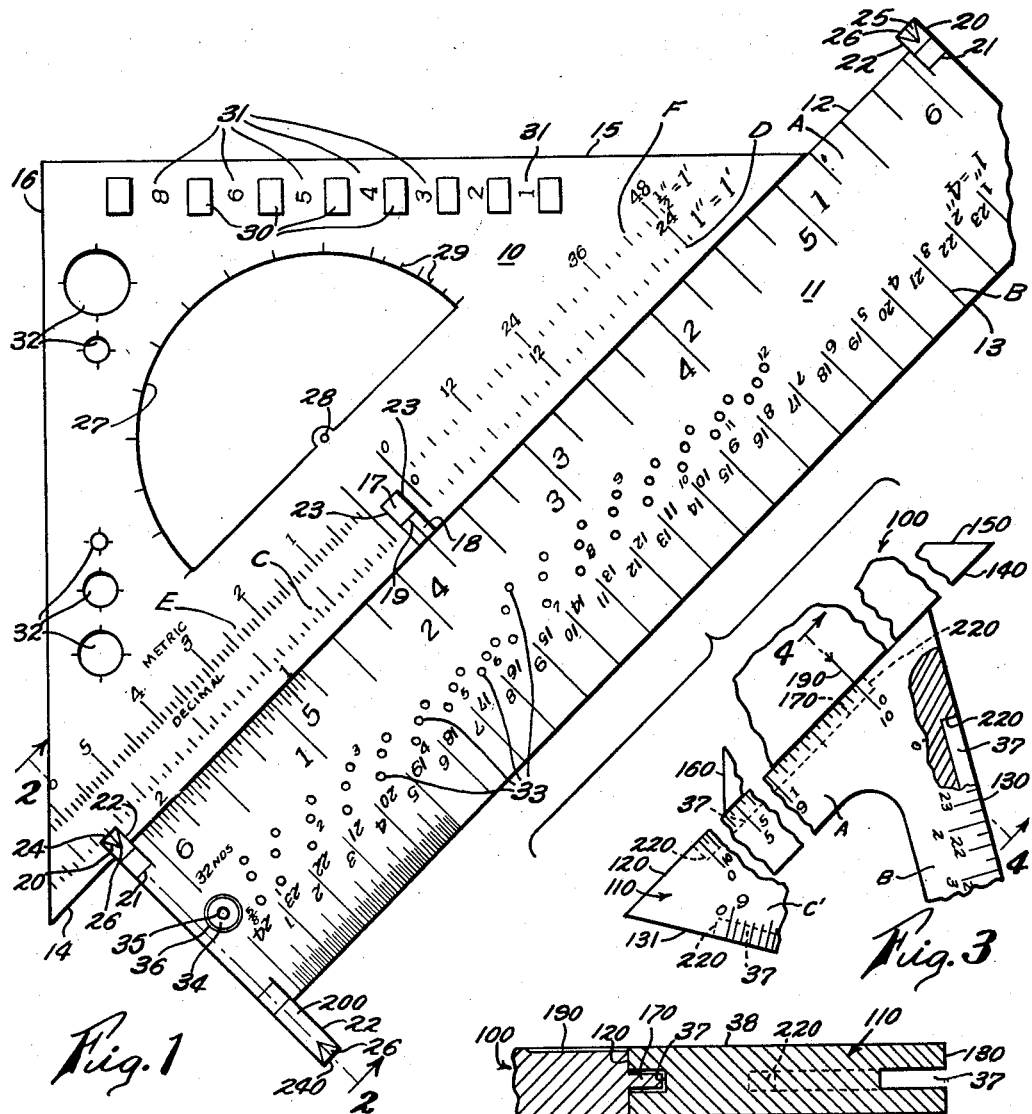
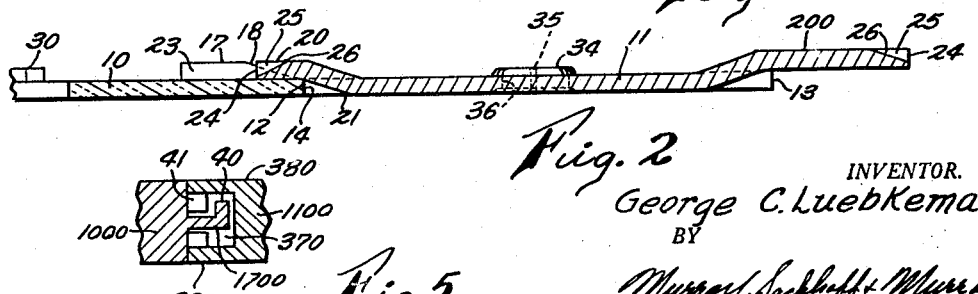
INVENTOR.
George C. Luebkeman
BY
Murray, Sackhoff & Murray
ATT'YS

United States Patent Office 2,883,754
Patented Apr. 28, 1959

2,883,754

DRAFTING DEVICES

George C. Luebkeman, Cincinnati, Ohio

Application May 31, 1955, Serial No. 511,957

2 Claims. (Cl. 33—104)

The present invention relates to drafting devices and has for an object the provision of a simple portable device comprising two members employed jointly and severally, along with the draftsman's pencil, for executing practically all drafting operations accurately to selected scale in an easy and rapid fashion.

Another object of the invention is to provide a device of this kind embodying relatively shiftable elements having enlarged reading scales affording direct accurate and easy adjustments of drawing edges at right angles to each other.

A still further object of the invention is to provide a pair of members of this kind with means to execute repetitious and special line spacing operations with a minimum of effort and with speed and with accuracy, and to execute arcs and circular lines on selected radii, and to otherwise render unnecessary the use of auxiliary drafting instruments such as compasses, measuring scales and others.

Another object of the invention is to afford in a device of this kind a member having a multiplicity of perforations arranged in relation to the sides and to a point near the end thereof, so as to enable the execution of both selected spaced lettering guide lines and arcs or circles of a selected radius.

These and other important objects are attained by the means described herein and exemplified in the accompanying drawings in which:

Fig. 1 is a plan view of a preferred form of the device of the invention showing the members arranged for drawing vertical and/or horizontal lines in true-scale, spaced, parallel relation to selected lines.

Fig. 2 is an enlarged sectional view taken on line 2—2 of Fig. 1.

Fig. 3 is a fragmental plan view of a modified form of device embodying the invention.

Fig. 4 is an enlarged cross sectional view taken on line 4—4 of Fig. 3.

Fig. 5 is an enlarged sectional view showing a modified form of the center stop lug and its cooperating groove.

As illustrated in Figs. 1 and 2 the device consists of two flat plane members, namely a 45° triangle member 10 and a companion straight edge member 11 having parallel edges 12 and 13 with which the hypotenuse edge 14 of the triangle 10 may be selectively abutted for slidable guided relative adjustment of said members 10 and 11 on a supporting drawing surface.

The edges 15 and 16 of triangle 10 are at right angles and are most frequently used for executing the straight lines of a drawing in a well known manner but without the necessity of first laying out measuring points with a separate scale. Hence it is one of the important advantages of this invention that the many time-consuming movements involved in making a drawing with accurate measurements according to selected scale size may be greatly minimized and that adjustments shall be made with greater ease and accuracy than by the heretofore used conventional drawing methods. For this purpose a raised, parallel sided center stop lug 17 is provided on the top face of triangle member 10 midway the ends of hypotenuse edge 14 and said lug has an inclined face 18 sloping down to edge 14. A center index line 19 is provided on said lug 18 and the said index line may be readily brought into registry with a selected graduation line of a reading scale A on the top face of the member 11 which scale has all graduation lines extending to the straight edge 12. A different reading scale B is similarly located with reference to straight edge 13 for cooperative use with the hypotenuse edge 14 and the center index line 19. The top face of triangle member 10 also carries four additional and different reading scales C, D, E and F disposed in two lines in spaced parallelism with edge 14 and on opposite sides of the center stop lug 17 as shown in Fig. 1. All of the aforementioned reading scales A through F inclusive have the spacings between the graduations thereof enlarged over the true measurement distances which they represent in the proportion of 1.4142:1. The enlarged spacings on the readings scales serve to minimize eye fatigue for the user because of ease in reading and more importantly, the matching of a selected reading scale graduation on one member with an index line on the other can be effected with speed and exceptional ease and accuracy especially in the case of 32nds or 65ths of an inch because the graduations on the reading scales are all spaced apart nearly one and one-half times the true distance measurement represented.

The member 11 is somewhat longer than its reading scales A and B, which scales are co-extensive and have uniform spacing between each of their ends and the outwardly projecting end stops 20 on edge 12. As shown herein stops or lugs 20 are struck upwardly from the body of member 11 at 21 and are then bent to parallel relation with said body so that the bottom face of the projecting end lug 20 may travel along the top edge margin of the hypotenuse edge 14 of the triangle 10 when the hypotenuse edge 14 of the triangle is shifted along edge 12 of member 11 as a sliding guide for said members. The edge 22 of end lug 20 is spaced from the adjacent end of reading scale A at a distance equal to the spacing between the side 23 of center lug 17 and the center index line 19 on said lug. This affords an automatic registry between center index line 19 and the endmost graduation at the adjacent end of the scale A whenever members 10 and 11 are shifted to bring the sides 22 and 23 of the respective lugs into abutment. The end 24 of lug 20 at this time registers with the bottom edge of reading scale C on the triangle at one side of center stop 17. The corresponding lug 20 at the other end of scale A will be registerable with reading scale D on the opposite side of said center stop 17. The end stops 20 are identical and each of them has an inclined tapered V-groove 25 in the top face thereof. The juncture of the sides of groove 25 forms an index line 26 which inclines downward for easy matching with the graduations of scales C or D. The ends of scales C, D, E and F on member 10 are uniformly spaced from the proximate sides 23 of lug 17 and the index line 26 on lug 20 will register with the endmost graduation on scale C or D when the lug 20 abuts the nearest side 23 of the center stop 17. In the position shown in Fig. 1 the user may employ a selected one of the scales A, C or D which are here indicated respectively as a normal scale divided into 32nds, a decimal inch scale, and a 1"=1' scale.

In a comparable manner and arrangement a longer end stop lug 200 may be provided at each end of the scale B along edge 13 so that when edge 13 of member 11 abuts hypotenuse edge 14 of member 10 the ends 240 of lugs 200 may register with the bottom edges of scales E and F, and the center index line 19 will cooperate with scale B.

From the foregoing it is to be noted that with members 10 and 11 lying with edges 14 and 12 or edges 14 and 13 in sliding abutment the user will have a total of six different scales to choose from and can shift the drawing edges 15 or 16 an accurately spaced true distance by easy adjustment of the members to a position where the selected index line 19 or 26 on the stop 17 or 20 is located in registry with the desired reading scale graduation on the scale in use. Given an existing line on which to match the drawing edge 15 or 16, or alternatively drawing such a line, it is necessary only to adjust the members 10 and 11 to the required reading on the selected scales and then hold member 11 in place and shift the triangle until the cooperating stops are in abutment and draw the second line in accurately spaced parallelism with the first or starting line. The adjustment of the edges 16 and 15 of member 10 in either direction laterally or vertically, respectively, with reference to the guiding edge of member 11, and the registration of index lines with the scale graduations on the members is simple and rapid and of course without the necessity of handling additional elements like scales or dividers.

An inside protractor arc 27 and a radial center point hole 28 are provided in the triangle member 11 by means of a cut out, and protractor degree graduations 29 are provided on the face of the triangle. This affords a simple and rapid means for placing the drawing edges 15 and 16 at selected angles to a line of reference on a drawing for executing lines and measurement locations angularly thereto as for example in drawing diagonal cross hatch lines, or more particularly to establish the first of a plurality of lines at a predetermined angle.

Where repetitious uniform spacing of parallel lines is wanted, as in cross hatching for example, I have provided an automatic spacing means as follows: A row of parallel sided bosses 30 is provided on the top face of the triangle 10 in uniformly spaced relation to the drawing edge 15. On the face of the triangle between adjacent bosses 30 the spaces are marked with indicia denoting the actual line spacing distance in 32nds of an inch that will be attained when edge 13 of member 11 is placed in abutment with edge 15 of member 10 and an end stop 200 is entered in the selected end identified space 31. The spacing between lugs bounding the space marked "1" is actually equal to the width of lug 200 plus one thirty-second of an inch. In use it is only necessary to alternately shift the members to progressively advance the members in the same direction and execute the cross hatch lines in the desired parallel spaced relation by using edge 16 as the guide for the pencil.

In the space adjacent edge 16 I also provide circular cut outs or holes 32 of diameters of commonly used holes or any other conventional shapes that are of convenience to the draftsman.

For the twofold purpose of scribing arcs or circles of different specific radii, and of drawing selected sets of parallel lettering guide lines, I have provided in the longitudinal center margin of member 11, between scales A and B, an extended series of perforations 33. Closely adjacent one end of said series is a rotatable finger piece 34 of transparent plastic with a center sighting hole 35 to permit location of the button or piece in accurately centered position over a dot or the intersection of lines or other locating point on a drawing. Button 34 is suitably retained in a bore 36 in member 11 and when the button is centered on a selected point on the drawing the operator may hold it in poistion by digital pressure of one hand and with the other hand the point of the pencil is inserted in a selected perforation 33 and moved across the drawing to scribe an arc or circle of accurately determined radius. The radial distance from sighting center 35 of two successive perforations 33 will be by increments of 1/32" or 1/16" or any predetermined common unit of increment. In Fig. 1 the first perforation is marked 3/8 indicating that the smallest circle possible with the illustrated device is of a diameter as indicated but the spacing between the holes is a radius of that diameter. Various perforations 33 have unit numbers 1–12 inclusive impressed adjacent them to indicate the corresponding circle diameters in full inches. The transverse zigzag arrangement of the perforations facilitates counting by fractional units in either direction from the indicated units.

The disposition of perforations 33 is further arranged in accordance with lateral spacing with respect to the edges 12 and 13 so that any three (or four) adjacent perforations 33 constitute a group for drawing lettering guide lines in parallelism and selected spacings between to correspond with accepted standardized sizes and styles of lettering. The member 10 is held on the drawing and the member 11 with the draftman's pencil inserted in the top or bottom perforation 33 of any transverse group is caused to guidedly shift member 11 to draw a first guide line in parallelism with the cooperating edges 14 and 12 for example as shown in Fig. 1. When the pencil point is next located in the adjacent perforation 33 of the selected group the member 11 is shifted with the pencil to draw the next parallel guide line is predetermined spaced relation to the first. The practice of using a perforated guide for drawing the parallel guide lines is known but the arrangement of such groups of perforations with respect to a radial point member such as 34 so that each successive perforation of the entire series enables selected arcs or circles to be drawn on any fractional inch radius is of importance and advantage in permitting the execution of any desired drawing using only the two piece device of the invention and a pencil.

The above described drafting device is suitable for students, field engineers and others who may find occasion to carry it in the coat pocket or briefcase. However the advantageous features of the device may be embodied in modified forms adapting them to the professional drafting board and for other special uses.

The member 11 need not provide straight edges such as 12 and 13 in parallelism since these edges are used selectively in using their associated scales A or B. Moreover the specific form of the cooperating stops may be modified. It will be understood that the sizes of members 10 and 11 will be determined by selecting the desired or convenient lengths of the drawing edges 15 and 16 on the triangle 10, while the length of a straight edge dimension on member 11 will determine the extent of the enlarged reading scale A or B to be provided and thus in turn will define the limits of accurately measured parallel adjustment of the drawing edges of the triangle.

Figs. 3 and 4 exemplify a modified form of the invention which eliminates all upstanding lugs or stops in order to provide a device that affords the benefits of the principal feature of the invention, namely the direct and accurately measured adjustment of the drawing edges of the 45° triangle for use in selected suitable sizes for the professional drafting table. For convenience and economy of manufacture the 45° triangle member 100 carries on its top face an engraved center index line 190 midway the ends of the hypotenuse edge 140. Projecting from the edge 140 is a center stop lug 170. The center lug 170 is rectangular in cross section and has its top and bottom faces in uniformly spaced parallelism to the planes of adjacent top and bottom faces of the triangle 100. The side edges of said stop lug are in spaced parallelism and are in vertical planes equidistant from the vertical plane in which the center index line 190 lies.

The straight edge member 110 in this embodiment is in the form of an equilateral triangle having in each of its three side edges 120, 130 and 131, a longitudinal center groove 37 in which the aforesaid center lug 170 may travel between end stops 220 constituted by the ends of said groove. The stops 220 may be integrally formed as shown in Fig. 3 or in any other way. The member 110 has on the two major faces 38 and 39 a plurality of reading scales, one adjacent each edge of each face, for examples on the top face (Fig. 3) the scales A and B extend along edges 120 and 130 and said scales each have their opposite end graduations disposed inwardly of the stops 220 in the groove 37 at a distance equal to the space between center index line 190 and the near side of center lug 170 of triangle 100 for automatically registering said center index line 190 with the proximate end of the scale when the said lug 170 abuts the end stop 220 in the groove 37. In this embodiment the scale C' along edge 131 is the same length as scales A and B. On the reverse face 39 three different additional scales (not detailed) are provided along the said edges 120, 130 and 131 and these are also of the same lengths as those on the top face 38. The reading scales have the spacings between graduations enlarged in the manner explained in detail in connection with Fig. 1.

The straight edge member 110 is desirably opaque as it carries scale graduations on both major faces. The member 100 is desirably of substantially transparent material and may be provided with any selected cut outs or perforations as desired (not illustrated) for example for drawing small circles or shapes, measuring arcs or executing lettering guide lines in a manner that is well understood in the art and amply described in connection with Fig. 1.

The drafting triangle and cooperating scale carrying member may be retained against accidental separation by any suitable means, for example as indicated in Fig. 5 wherein the triangle 1000 has a center stop lug 1700 with an enlargement such as an upstanding part 40 formed on the end of it, and a scale carrying straight edge member 1100 has a groove 370 which is T-shaped in cross section in which the said stop lug may travel and thus keep the abutting edges of members 1000 and 1100 in position when the device is bodily shifted as a unit. The stop lug 1700 is entered into and removed from interlocked engagement in the groove 370 through an opening 41 which may be desirably located midway the ends of the groove. In the form shown the reading scales may be provided on both faces 380 and 390 and along each grooved edge of member 1100.

The member 11 or any variant thereof may be removably connected to any variety of known drafting machine by providing a connecting member like the one used for detachably mounting the ruling blades or scales of such drafting machine.

In any embodiment of the device the index line may be carried on slidably adjustable pieces and shifted in the direction of the center line to register the end of the center line selectively with parallel scales such as are shown for example at C and E in Fig. 1.

What is claimed is:

1. In a drafting device the combination of a 45° drafting triangle having a center index line on the top face midway the ends of its hypotenuse edge, a center stop on said triangle having its opposite sides uniformly spaced on opposite sides of said index line, a companion member having at least one straight edge for guided sliding abutment with said hypotenuse edge of said triangle, end stops adjacent each end of the straight edge cooperating with said center stop for limiting relative guided sliding movement of the triangle and its companion member, the last mentioned member having on at least one face thereof along said straight edge oppositely extending, zero reading scales located midway the end stops and having the endmost zero graduations spaced from the adjacent end stops at a distance equal to the space between the center index line and one side of the center stop of the triangle, the spacing between adjacent graduation lines on the scale being enlarged over true measurement distance represented thereby in the proportion of 1.4142:1, the remaining edges of the drafting triangle constituting drawing edges at 90° to each other and at 45° to the straight edge whereby adjustment of the index line of the triangle with respect to the graduations of the reading scale will shift the respective drawing edges a correspondingly selected true scale distance, the abutment of either side of the center stop with an end stop serving to automatically register the center index line on the triangle with the end graduation at the proximate end of the scale.

2. The combination as set forth in claim 1 wherein the companion member has two straight edges with end stops, the end stops of one of the straight edges are of greater length than those of the other, and the triangle has parallel different reading scales on each side of the center stop spaced from the hypotenuse edge at distances corresponding to the lengths of the respective stops.

References Cited in the file of this patent

UNITED STATES PATENTS

| | | |
|---|---|---|
| 364,508 | Griffiths | June 7, 1887 |
| 1,237,440 | Rivkin | Dec. 10, 1918 |
| 1,441,533 | Knox | Jan. 9, 1923 |
| 1,808,705 | Owen | June 2, 1931 |
| 2,352,838 | Hurley | July 4, 1944 |
| 2,627,116 | Cangialosi | Feb. 3, 1953 |

FOREIGN PATENTS

| | | |
|---|---|---|
| 464,292 | Italy | June 26, 1951 |
| 110,506 | Switzerland | June 16, 1925 |